United States Patent
Li et al.

(10) Patent No.: US 9,100,303 B2
(45) Date of Patent: Aug. 4, 2015

(54) METHODS, DEVICES, AND SYSTEMS FOR ALLOCATING IP ADDRESS

(75) Inventors: Bin Li, Beijing (CN); Sheng Wang, Beijing (CN); Chao Xu, Beijing (CN)

(73) Assignees: Beijing Lenovo Software Ltd. (CN); Lenovo (Beijing) Limited (CN)

(*) Notice: Subject to any disclaimer, the term of this patent is extended or adjusted under 35 U.S.C. 154(b) by 232 days.

(21) Appl. No.: 13/993,225

(22) PCT Filed: Nov. 30, 2011

(86) PCT No.: PCT/CN2011/083222
§ 371 (c)(1),
(2), (4) Date: Jun. 11, 2013

(87) PCT Pub. No.: WO2012/079461
PCT Pub. Date: Jun. 21, 2012

(65) Prior Publication Data
US 2013/0275588 A1 Oct. 17, 2013

(30) Foreign Application Priority Data
Dec. 13, 2010 (CN) .......................... 2010 1 0601017

(51) Int. Cl.
*H04L 12/26* (2006.01)
*H04L 29/12* (2006.01)

(52) U.S. Cl.
CPC ........ *H04L 43/0823* (2013.01); *H04L 61/2015* (2013.01); *H04L 61/2046* (2013.01)

(58) Field of Classification Search
CPC .................................................. H04L 43/0823
USPC ................................ 709/224, 225, 226, 227
See application file for complete search history.

(56) References Cited

U.S. PATENT DOCUMENTS

| 7,756,994 B2 | 7/2010 | Yumoto |
| 2007/0097992 A1* | 5/2007 | Singh et al. ............... 370/395.54 |
| 2010/0094954 A1* | 4/2010 | Han et al. ...................... 709/219 |

FOREIGN PATENT DOCUMENTS

CN 1961536 A 5/2007

OTHER PUBLICATIONS

"IPv4 Conflict Detection for Ethernet/IP Devices"—ODVA, Jul. 2004 http://www.odva.org/Portals/0/Library/Publications_NotNumbered/IPv4_Address_Conflict_Detection_for_EtherNetIP_Devices_v_1.0.pdf.*

"International Application Serial No. PCT/CN2011/083222, International Search Report mailed Mar. 8, 2012", 2 pgs.

* cited by examiner

*Primary Examiner* — Randy Scott
(74) *Attorney, Agent, or Firm* — Schwegman Lundberg & Woessner, P.A.

(57) ABSTRACT

The embodiments of the present disclosure provide a method, a device and a network system for allocating an IP address. The allocating method comprises: allocating a first IP address to a first server; allocating a second IP address to a client connected to the first server; monitoring the client allocated with the second IP address; allocating a third IP address to the first server when a monitoring result indicates that an IP address conflict exists between the first IP address and a current IP address of a second server; wherein the second server is connected to the client allocated with the second IP address. The method may reallocate the IP address automatically when a subnet conflict occurs.

21 Claims, 2 Drawing Sheets

METHODS, DEVICES, AND SYSTEMS FOR ALLOCATING IP ADDRESS

This application is a U.S. National Stage Application filed under 35 U.S.C. §371 of International Application Serial No. PCT/CN2011/083222, filed on Nov. 30, 2011 and published as WO 2012/079461 A1 on Jun. 21, 2012 which application claims priority to Chinese Application No. 201010601017.4, filed on Dec. 13, 2010, both of which applications and publication are incorporated herein by reference in their entireties.

TECHNICAL FIELD

Embodiments of the present disclosure relate to an Internet field, and more particularly, to methods, devices, and systems for allocating an IP address.

BACKGROUND

Existing Internet performs networking and data transmission via TCP (Transmit Control Protocol)/IP (Internet Protocol). Two terminals connected to the Internet must have their respective IP addresses, so as to communicate with each other. However, due to the limited resources of the IP addresses, the operator cannot allocate a fixed IP address for each of end-users. Currently, the networking terminal is temporarily allocated an address using DHCP (Dynamic Host Configure Protocol). That is, when the user terminal is networking, one IP address is temporarily allocated by a DHCP server from an address pool to the networked terminal. The allocated IP addresses may be different each time the user terminal is networking. When the user terminal is off the network, the DHCP server allocates the address to other user terminal sequentially networked. This may effectively save IP addresses, which may ensure communication of the terminal user and may also improve usage of the IP addresses.

In the network using the TCP/IP protocol, each terminal must have at least one IP addresses to communicate with other terminal(s). But sometimes a situation may appear where a terminal has multiple IP addresses. As shown in FIG. 1, one client connects to a plurality of DHCP servers. The plurality of DHCP servers allocate IP addresses to the client, respectively. The client communicates with other terminals in different subnets by respective one of the plurality of DHCP servers. The DHCP server acts as a subnet gateway, and also has its own IP address subnet segment for allocating IP address to itself and its client connected thereto. Therefore, there may be a subnet IP address conflict existing between different DHCP servers. The solution for the IP address subnet conflict of the DHCP server in the prior art is only to modify the IP address subnet segment of the DHCP server manually. And, since the same batch of DHCP servers have the same factory settings, i.e. the same IP addresses and subnet masks, it is also required to configure the IP address of the DHCP server manually when the DHCP server is started up.

SUMMARY

In order to solve a problem of automatically allocating an IP address when there is a subnet IP address conflict in a server, an embodiment of the present disclosure provides a method of allocating an IP address, comprising: allocating a first IP address to a first server; allocating a second IP address to a client connected to the first server; monitoring the client allocated with the second IP address; allocating a third IP address to the first server, when a monitoring result indicates that an IP address conflict exists between the first IP address and a current IP address of a second server; wherein the second server is connected to the client allocated with the second IP address.

Particularly, the IP address conflict existing between the first IP address and the current IP address of the second server comprises: the first IP address and the current IP address of the second server are identical, and a connection message of the client is not received during a preset time period.

Or particularly, before allocating the second IP address to the client connected to the first server, the method further comprises: detecting physical access of the client; and after allocating the second IP address to the client connected to the first server, the method further comprises: initiating the monitoring of the client.

Or particularly, the monitoring result indicating that an IP address conflict exists between the first IP address and the current IP address of the second server comprises: receiving a message from the client as a subnet conflict message, the subnet conflict message indicating that a subnet conflict exists between a subnet in which the first server is located and a subnet in which the second server is located.

Or, the IP address conflict existing between the first IP address and the current IP address of the second server further comprises: maintaining the monitoring after a connection message of the client is received during a preset time period; receiving a message from the client as a subnet conflict message, the subnet conflict message indicating that a subnet conflict exists between a subnet in which the first server is located and a subnet in which the second server is located.

Or, allocating the first IP address to the first server and/or allocating the third IP address to the first server are/is random allocation.

Preferably, the random allocation comprises:
allocating an IP address segment randomly, and allocating an IP address in the IP address segment to the first server.

Or preferably, the method further comprises: obtaining an IP address segment manifest; and
avoiding addresses in the IP address segment manifest, when the first IP address and/or the third IP address are/is allocated to the first server.

Preferably, the method further comprises:
adding the current IP address and a subnet mask of the second server to the IP address segment manifest, when the monitoring result indicates that the subnet conflict exists between the first IP address and the current IP address of the second server.

The present disclosure further provides a server of allocating an IP address, comprises:
a server address allocation module configured to allocate a first IP address to a first server;
a client address allocation module configured to allocate a second IP address to a client connected to the server;
a monitoring module configured to monitor the client allocated with the second IP address, and notify the server address allocation module of allocating a third IP address to the server when a monitoring result indicates that a subnet conflict exists between the first IP address of the server and a current IP address of a second server; wherein the second server is connected to the client and is different from the server.

Particularly, the monitoring module is configured to deduce the result indicating that the IP address conflict exists between the first IP address and the current IP address of the second server, when the monitoring module does not receive a connection message of the client during a preset time period; and for deducing a monitoring result indicating that a subnet conflict exists between the first IP address of the server and the current IP address of the second server, according to the result of IP address conflict.

Preferably, the monitoring module is configured to maintain the monitoring after the connection message of the client is not received during the preset time period; and for deducing the monitoring result indicating that the subnet conflict exists between the first IP address of the server and the current IP address of the second server, when the monitoring module receives a subnet conflict message from the client, the subnet conflict message indicating that the subnet conflict exists between the first IP address of the server and the current IP address of the second server.

Or particularly, the monitoring result indicating that the subnet conflict exists between the first IP address of the server and the current IP address of the second server comprises: receiving a message from the client as a subnet conflict message, the subnet conflict message indicating that the subnet conflict exists between a subnet in which the server is located and a subnet in which the second server is located.

Or particularly, the server further comprises: a detection module configured to notify the client address allocation module, after a physical connection is established between the client and the server;

the client address allocation module is further configured to notify the monitoring module of initiating the monitoring of the client, after the second IP address is allocated to the client.

Or particularly, the server address allocation module is configured to allocate the first IP address and/or the third IP address randomly.

Or particularly, the server further comprises a storage module configured to store an IP address segment manifest;

the server address allocation module is further configured to obtain the IP address segment manifest from the storage module, and avoiding an IP address range contained in the IP address segment manifest when the first IP address and/or the third IP address are/is allocated.

Preferably, the server further comprises: an IP address segment addition module configured to save the current IP address and a subnet mask of the second server in the IP address segment manifest, when the monitoring result of the monitoring module is received; wherein the monitoring result is that the subnet conflict exists between the first IP address of the server and the current IP address of the second server.

The present disclosure further provides a network system comprising a first server and a client, the first server is configured to allocate a first IP address to itself, and allocate a second IP address to the client, the client being connected to the first server at this point;

the first server is further configured to monitor the client, and allocate a third IP address to itself when a monitoring result indicates that a subnet conflict exists between the first IP address of the server and a current IP address of a second server; wherein the second server is connected to the client and is different from the first server.

Particularly, the client is configured to calculate on a current IP address and a subnet mask of the server which allocates the IP address to the client, and when the subnet conflict occurs between the first IP address and the current IP address of the second server, the client sends to the first server a subnet conflict message indicating that the subnet conflict occurs between the first IP address and the current IP address of the second server.

Or, the client is configured to receive a connection message sent by the server which allocates the IP address to the client; and the first server is further configured to deduce the monitoring result indicating that the subnet conflict exists between the first IP address and the current IP address of the second server.

Preferably, the client does not comprise a display unit, and a display unit in the server is configured to display the client and/or data of the server.

By means of monitoring, the subnet conflict may be obtained when and after the client is connected to the server, and the IP address may be reallocated to the server itself timely and automatically. Thus, the problem of manually adjust the IP address of the server when there is the subnet conflict in the server in the prior art may be solved. Furthermore, the subnet conflict may be avoided in a great extent by randomly allocating the IP address segment when the server starts up, and evading the IP address segment manifest to allocate the IP address segment, or the combination thereof.

DETAILED DESCRIPTION OF PREFERRED EMBODIMENTS

Technical solutions of the present disclosure will be detailed with reference to the drawings and detailed description, in order to clarify objects, technical features, and effects of the present disclosure.

Figure 1:
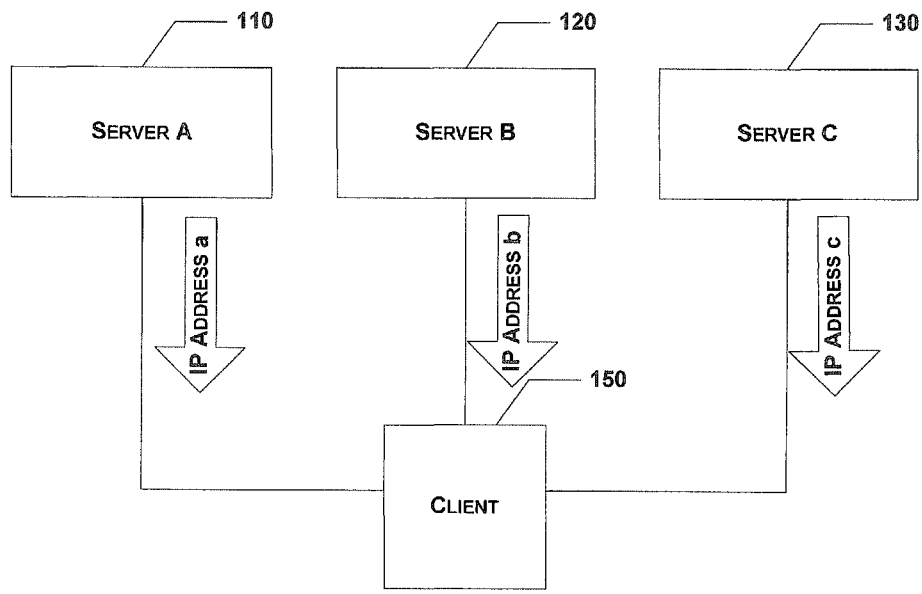
FIG. 1 is an illustrative diagram in which a client is connected to a plurality of servers concurrently.

Taking a scenario shown in FIG. 1 as an example, an embodiment of the present disclosure provides following implementations.

The server A 110 allocates a first IP address to itself. The server A 110 allocates a second IP address to the client 150 connected to the server A 110. The server A 110 monitors the client 150 which is allocated with the second IP address.

When the monitoring result indicates that an IP address conflict exists between the first IP address and the current IP address of the server B 120 or the server C 130, the server A 110 is allocated with a third IP address, wherein the server B 120 is connected to the client 150 which is allocated with the second IP address.

A DHCP server is taken as an example in the embodiments hereinafter for a convenient description. However, other servers capable of dynamically allocating the IP address may also be possible. As will be understood by the skilled in the art, the server is not limited to the DHCP server.

Figure 2:
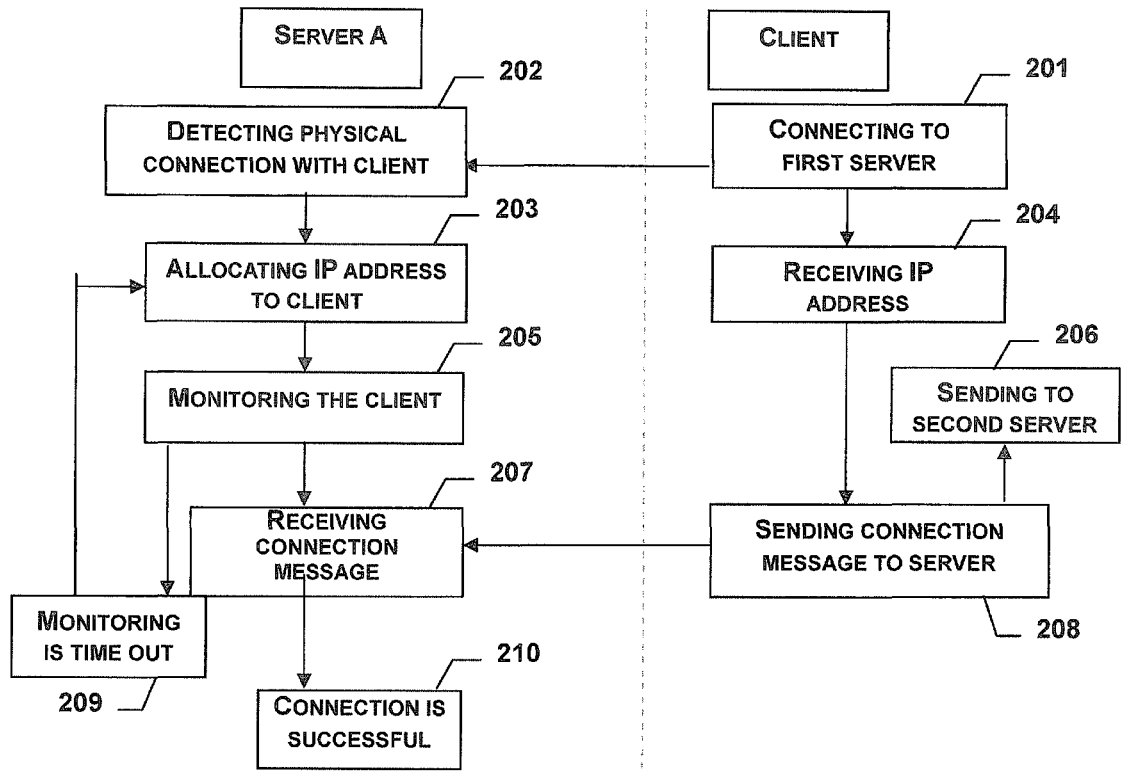
FIG. 2 is an illustrative monitoring diagram according to one embodiment of the present disclosure.

FIG. 2 shows an embodiment of the method for allocating the IP address in connection with the scenario of FIG. 1.

Firstly, the IP address allocated by the DHCP server A 110 to itself is the first IP address. The DHCP server A 110 allocates the IP address to itself for the first time by requesting the network for obtaining some subnet segment when it is started up and connected to the network, and allocating IP addresses in the subnet segment. The IP address of the DHCP itself is a gateway address of the subnet segment. The subnet segment may be represented by the gateway address and the subnet mask.

In block 201, the client 150 tries to establish a network connection with the server A 110. In block 202, when the DHCP server A 110 detects a physical connection from the client 150, including the client 150 connects via a network cable or by wireless network card, in block 203, the client 150 is allocated with the IP address a in the subnet segment, and sends the subnet mask and the gateway address to the client 150 along with the current IP address (the first IP address at this time) of the DHCP server A 110. In block 204, the client 150 receives the IP address.

Next in block 205, the DHCP server A 110 initiates monitoring of the client 150. In block 208, the client 150 may need to send a connection message to the DHCP server A 110, after the client 150 is allocated with the IP address a. The connection message may be a simple ACK, i.e. a reply to the reception, or a data packet carrying valid data. In block 207, if the DHCP server A 110 receives the connection message, it is shown that the client 150 has connected to the DHCP server A 110 normally. In block 210, the connection is successful.

Before this, the client 150 has normally connected to the DHCP server B 120, i.e., the DHCP server B 120 has allocated the IP address B to itself and has allocated the IP address b to the client 150 and established a communication connection with the client 150, the client 150 also saves the gateway address of the subnet segment where the DHCP server B 120 is located, i.e., the current IP address B of the DHCP server B 120. When the value of the IP address B is identical with the value of the first IP address, i.e., when there is a conflict between the current IP address of the DHCP server A 110 and the current IP address of the DHCP server B 120, it is very possible that the connection message which should have been sent to the DHCP server A 110 by the client 150 may be sent to the DHCP server B 120 in block 206 since it is sent to the first IP address which conflicts with the value of the IP address B. Thus, this may cause that in block 209, the DHCP server A 110 may not receive the connection message from the client 150 during a predetermined time period. When the client 150 is wiredly connected to the server, the predetermined time period may be set to be 4~5 s. If the client 150 is wirelessly connected to the server, the predetermined time period may be extended to be 20 s. The DHCP server A 110 not receiving the connection message from the client 150 during the predetermined time period means that the monitoring result indicates that an IP address conflict occurs between the first IP address and the current IP address of other DHCP server connected to the client 150 (i.e. the DHCP server B 120 in the present embodiment). Therefore, the subnet segments where the DHCP server A 110 and the DHCP server B 120 are located respectively may be at least partly overlapped with each other. The subnet conflict existing between the two subnet segments will cause the IP address conflict.

Thus, the DHCP server A 110 switches the IP address automatically. For example, the DHCP server A 110 may not switch the subnet segment, but only switch the IP address. This is suitable for a one-to-one network connection, e.g. a case where there is no other device in the network consisting of the server A 110 and the client 150 in which the server A 110 only connects to the client 150 via a connection interface or a connection line (such as USB).

Or, the DHCP server A 110 may switch the subnet segment and select a new IP address. For example, a third IP address in a new subnet segment may be allocated to the DHCP server A 110 itself, and a new IP address in this new subnet segment may be allocated to the client 150. The DHCP server A 110 may send to the client 150 a new gateway address, the IP address of the client and the subnet mask. The subnet mask represents the number of the IP addresses in the subnet segment, which may not change in the procedure of re-requesting the subnet segment by the DHCP server A 110. Thus, when the IP address is reallocated to the client 150, the subnet mask may not be sent to the client 150, and the client 150 may still maintain the subnet mask obtained when acquiring the IP address for the first time.

After the client 150 receives a new IP address, it also needs to send a connection message to the DHCP server A 110. At this time, the current IP address of the DHCP server A, i.e., the third IP address, does not conflict with the current IP addresses of other DHCP servers concurrently connected to the client (the DHCP servers B and C 120, 130 as shown in FIG. 1). The client 150 may send the connection message to the correct destination, i.e. the DHCP server A 110, which means that a normal communication connection is established between the DHCP server A 110 and the client 150. The DHCP server A 110 which has received the connection message may close the monitoring of the client 150, without re-switching the subnet segment and reallocating the IP addresses to itself and the client 150.

It is also possible that in the above steps, after the DHCP server A 110 allocates the third IP address to itself and reallocates the IP address to the client 150, the third IP address may conflict with the current IP address of the DHCP server C 130 (as shown in FIG. 1, the DHCP server C also has a communication connection with the client) again. The connection message which should have been sent to the DHCP server A 110 by the client 150 may also be sent to the DHCP server C 130 since it is sent to the third IP address. The DHCP server A 110 does not receive the connection message from the client 150 during the predetermined time period, whose monitoring results is that there is the IP address conflict between the current IP address of its own (i.e. the third IP address) and the current IP address of other DHCP server connected to the client (the DHCP server C 130 in this example). Therefore, there is also a subnet conflict between the subset segments where the DHCP server A 110 and the DHCP server C 130 are respectively located. Thus, the DHCP server A 110 re-switches the subset segment, allocates a fourth IP address in a new subnet segment to itself, and allocates a new IP address in this new subnet segment to the client 150.

As such, by means of monitoring during the preset time period, it may be determined whether there is IP address conflict between the current IP address of the DHCP server and the current IP address of other network entity, and when a conflict result is monitored, the IP address of the server itself may be reallocated, and the IP address of the client may also be reallocated, so as to avoid trouble of modifying the IP address of the server manually. The user may conveniently use the DHCP server without sufficient network knowledge and certain understanding on the operation system of the server.

Figure 3:
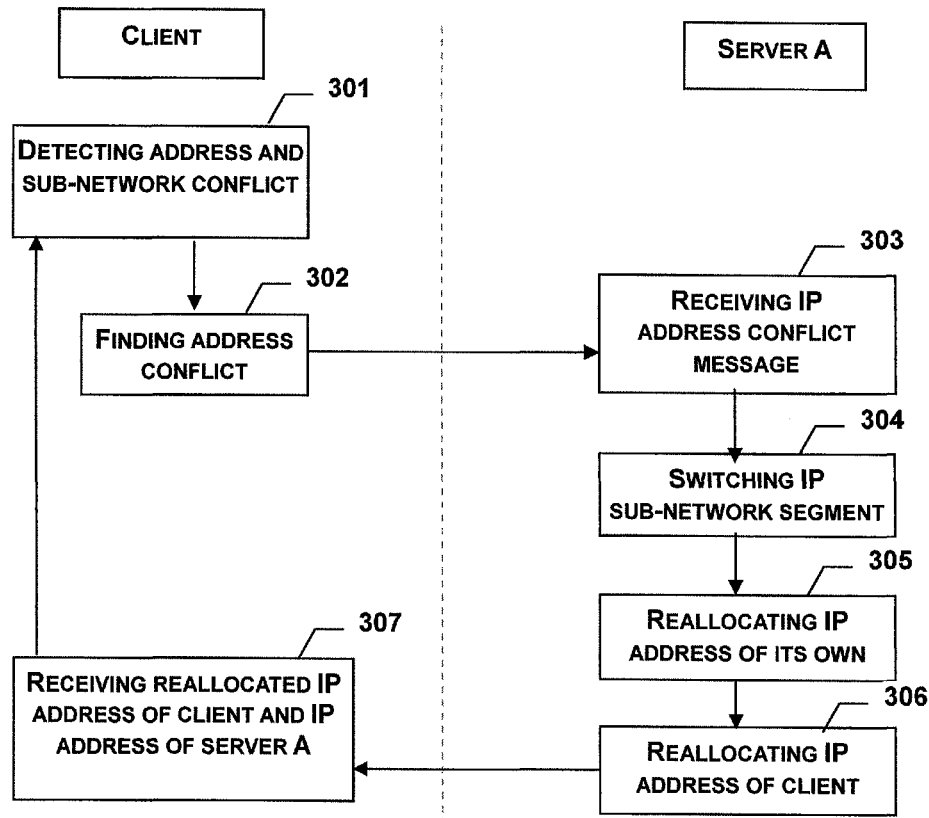
FIG. 3 is an illustrative monitoring diagram according to another embodiment of the present disclosure.

FIG. 3 is another embodiment of the method of allocating the IP address according to the present disclosure, which processes the subnet conflict between the current IP addresses of two or more DHCP servers when communication connections have been established between the two or more DHCP servers and the same client.

Under e.g. the scenario as shown in FIG. 1, the client 150 has established communication connections with three DHCP servers A, B and C, wherein the DHCP server A 110 is the DHCP server applied in the embodiment of the present disclosure. The DHCP server A 110 requests the network for the subnet segment, and allocates to itself a first IP address in the subnet segment, and allocates to the client 150 a second IP address different from the first IP address in the subnet segment. After the DHCP server A 110 receives a connection message sent from the client 150 and establishes a communication connection with the client 150, the DHCP server A 110 monitors the client 150. The DHCP server B and C 120 and 130 are DHCP servers in the prior art.

Firstly, in block 301, the client 150 detects whether there is a subnet conflict between the current IP addresses of the three DHCP servers connected therewith. The client 150 calculates on the received gateway addresses sent by each of the DHCP servers (i.e. the current IP addresses of the servers) and the subnet mask respectively. The calculation result is that IP address segments are authorized by the network, in which the IP addresses may be allocated freely. The client may also use the IP address segment which is obtained by calculating on the allocated IP address and the subnet mask. The client may compare these IP address segments. When the IP address segment where the DHCP server A 110 is located overlaps or partly overlaps with the IP address segment where the DHCP server B is located, subnet conflict exists between the current IP addresses of the DHCP servers A and B 110 and 120.

When the IP address segment where the DHCP server A 110 is located overlaps or partly overlaps with the IP address segment where the DHCP server C 130 is located, if the client 150 wants to communicate with the device locating at some IP address covered by the overlapped part, it does not know whether the DHCP server A 110 or the DHCP server C 130 may be used as the gateway. Therefore, it is possible to send to any of networks, and a problem will arise. Hence, in the situation that the IP address segments are overlapped partly, subnet conflict exists between the current addresses of the DHCP servers A and C 110 and 130.

When the DHCP servers B and C 120 and 130 are also the DHCP servers in the present disclosure, comparison of subnet segments between the DHCP servers B and C 120 and 130 is not necessary, since the client 150 has calculated and compared before the DHCP server A 110 connects to the client 150.

In practice, when the client 150 detects that there is subnet conflict between the current IP addresses of the DHCP server A 110 and the DHCP server B 120, the device type of the server is detected. For example, in block 203, when it is detected that the DHCP server B 120 is of a service type not capable of automatically reallocating the IP address to itself, i.e., the current DHCP server, a subnet conflict message is sent to the DHCP server A 110. In block 303, the server A 110 receives the subnet conflict message. When both of the two DHCP servers having the subnet conflict are the DHCP server in the present disclosure, the client may randomly send the subnet conflict message to either of the DHCP servers. The client may also be configured to send the subnet conflict message to the DHCP server which is accessed lately or early by the client.

In block 304, the DHCP server A 110 monitoring the subnet conflict message from the client 150 may determine that the conflict message indicates that there is subnet conflict between the current IP address of the DHCP server A 110 and the current IP address of the DHCP server B 120, the DHCP server A 110 automatically switches the subnet segment, allocates a third IP address in a new subnet segment to itself in block 305, and allocates a new IP address in this new subnet segment to the client in block 306 and sends to the client 150.

After the client 150 receives the IP address reallocated by the DHCP server A 110 and the third IP address of the DHCP server A 110 in block 307, the client 140 continues to detect whether there is a subnet conflict in block 301. The client 150 calculates on the IP address segment and detects the subnet conflict, and communicates with the DHCP server, so that when the subnet conflict occurs between the servers, the DHCP server may automatically switch the subnet segment, reallocate the IP address of the server itself, and reallocate the IP address of the client. Thus, the trouble of modifying the IP address of the server manually may be avoided. The user may conveniently use the DHCP server without sufficient network knowledge and certain understanding on the operation system of the server.

A more preferable embodiment provided by the present disclosure is to combine the technical solutions of the above two embodiments. In the embodiment of FIG. 2, when there is IP address conflict between the DHCP server A 110 and other DHCP servers connected to the client 150 concurrently (e.g., the DHCP server B 120), the connection message sent by the client 150 is possible to be sent to the DHCP server A 110 or the DHCP server B 120. If the connection message is sent to the DHCP server A 110, the DHCP server A 110 cannot deduce the monitoring result indicating that there is IP address conflict between the servers connected to the same client, i.e., will not deduce the result indicating that there is subnet conflict between the current IP addresses of these servers, and will not switch the subnet segment and reallocate the IP addresses of its own and the client. The DHCP server A 110 receiving the connection message does not close the monitoring, but continues to maintain the monitoring. In this case, in connection with the embodiment of FIG. 3, the DHCP server A 110 establishes a communication connection with the client, and the client detects whether there is subnet conflict between the current IP address of the DHCP server A 110 and the current IP addresses of the other servers connected thereto, when the client 150 establishes a communication connection with a newly accessed server (the DHCP server A in this example).

If there is subnet conflict, the client sends a subnet conflict message to notify the DHCP server applicable to the present disclosure (the DHCP server A 110 in this example). After the DHCP server A 110 receives the conflict message, it automatically switch the subnet segment, reallocates the IP address to itself and reallocates the IP address to the client. Or, the DHCP server A 110 newly connected to the client monitors the client 150. The client sends to network configuration information of the DHCP servers B and C120 and 130 to the DHCP server A 110. The DHCP server A 110 calculates the subnet segment range, and determines whether there is subnet conflict between the new DHCP servers B and A, and between the DHCP servers C and A. When the calculation result of the DHCP server A indicates that the above subnet segments are at least partly overlapped, the monitoring result indicates that there is subnet conflict between the current IP addresses of the DHCP server A and the DHCP server B or C.

In order to reduce the possibility of the subnet conflict of the DHCP server and alleviate the trouble of manually modifying the IP address of the DHCP server, another method embodiment provided by the present disclosure is that the DHCP server randomly allocates the IP address segment within which an IP address is allocated to itself. Allocating the IP address in the address segment to the DHCP server itself generally is to select a particular address, such as a first IP address in the segment, in the address segment, or to select an IP address in the segment randomly.

Since the same type and the same batch of DHCP servers have the same factory settings, the IP address segment has already been recorded in the server, and needs to be modified manually when the server is started up. Using the method of allocating the IP address segment randomly when started up, no manual modification is needed, and the possibility of IP address conflict is less by the random allocation. For example, this method may be used when allocating the first IP address, or reallocating, i.e., allocating the third IP address, or when allocating both the first IP address and the third IP address.

In order to reduce the possibility of the subnet conflict of the DHCP server and alleviate the trouble of manually modifying the IP address of the DHCP server, the present disclosure also provides a method embodiment of providing an IP address manifest. An IP address or address segment manifest may be established. The IP address segments of commonly used general routers and other IP address allocation devices set by factory may be listed to the manifest. The manifest is evaded when the IP address segment is allocated to the DHCP server itself, e.g., getting cross the address segments in the manifest directly. Or, when the IP address segment is allocated, it is detected that the IP address segment is in the manifest. Or when the IP address segment is at least partially overlapped with the address segment range of the manifest, the IP address segment is reallocated.

There may be various combination approaches combined with the above embodiment of allocating randomly. For example, when the DHCP server A starts up, the IP address segment manifest may be evaded, and allocates other IP address segment randomly to itself or only allocates the IP address segment randomly. When the monitoring results indicates the subnet conflict, the DHCP server may allocate the IP address segment randomly, or may allocate the IP address segment randomly based on avoidance of the IP address segment manifest. A more preferable embodiment is that when the detection result indicates that there is subnet conflict, the IP address causing the conflict and/or the subnet segment where the IP address causing the conflict is located are joined to the IP address segment manifest, so as to directly avoid the conflict when allocation. Particularly, the gateway address (i.e. the current IP address of the server) and the subnet mask are joined to the IP address segment manifest. For example, there is subnet conflict between the current IP addresses of the DHCP server A and the DHCP server B, i.e., there is subnet conflict between the first IP address and the IP address B, the DHCP server A receives the monitoring result, and adds "IP address B+subnet mask" to the IP address segment manifest. Thus, when the DHCP server A switches the IP address segment, the address segment where the IP address B is located may be evaded, thereby the third IP address and the IP address of the client may be allocated. Of course, the last approach of adding the IP address segment is more suitable for establishing a temporary space to save such category of IP address segments, The temporary space may be cleared when being closed this time or starting up the DHCP server A next time or periodically. Of course, it may not be cleared automatically, but manually.

Figure 4:
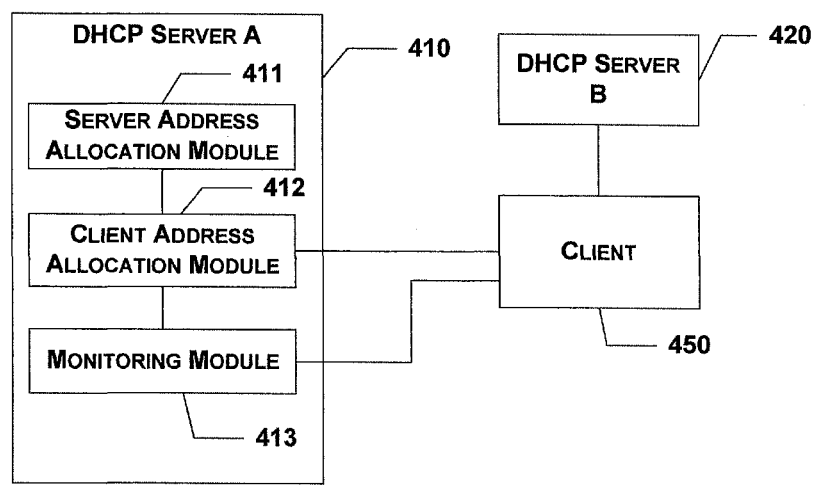
FIG. 4 is a structure diagram of a device embodiment of the present disclosure.

The present disclosure may also provide a device embodiment of a DHCP server applicable to the above method embodiment. As shown in FIG. 4, the DHCP server A 410 may include a server address allocation module 411, a client address allocation module 412 and a monitoring module 413. The sever address allocation module 411 may be configured to allocate an IP address to the DHCP server A itself; the client address allocation module 412 may be configured to allocate a second IP address to the client 450 connected to the DHCP server A 410; the monitoring module 413 may be configured to monitor the client 450 allocated with the second IP address, and to notify the server address allocation module 411 of reallocating an IP address to the DHCP server A 410 when a monitoring result indicates that a subnet conflict exists between the IP address of the DHCP server A 410 and the current IP address of the D450 which is allocated with the second IP address. The DHCP server B 420 may also connect to the client 450 which is allocated with the second IP address.

In a more preferable embodiment, the monitoring module 413 may contain a timer (not shown). The DHCP server A 410 may further contain a detection module (not shown). After it is detected that there is a client establishing a physical connection with the DHCP server A 410, the client address allocation module 412 is notified of allocating the client with an IP address. A certain time period may be preset to the timer in the monitoring module 413. When the monitoring module 413 does not receive a connection message from the client 450 during the preset time period, the server address allocation module 411 is notified that there is IP address conflict between the current IP addresses of the DHCP server A 410 and other DHCP server connected to the client. The server address allocation module switches the IP address segment and reallocates the IP address to itself.

In a more preferable embodiment, the monitoring module 413 receives the IP address conflict message from the client which is allocated with the second IP address. The conflict message indicates that there is IP address conflict between the current IP addresses of the DHCP server A 410 and other DHCP server (the DHCP server B 420) connected to the client. The monitoring module 413 notifies the conflict message to the server address allocation module 411. The server address allocation module 411 switches the IP address segment and reallocates the IP address to itself.

Another more preferable embodiment combines the above two embodiments. The monitoring module 413 determines that there is IP address conflict between the current IP addresses of the DHCP server A 410 and other DHCP server connected to the client 450, based on the connection message received from the client 450 during the preset time period, and notifies the server address allocation module 411. Also, the monitoring module 413 may notify the server address allocation module 411 of the IP address conflict message from the client. When the server address allocation module 411 receives the messages, it switches the IP address segment, and reallocates the IP address in the address segment to itself, and then reallocates the IP address in the address segment to the client.

The present disclosure also provides such a device embodiment as follows: the DHCP server A 410 includes a server address allocation module 411 for configured to allocate the IP address segment to the server itself randomly, or select the IP address from the address segment randomly or specifically, e.g. select the first IP address of the address segment.

The present disclosure also provides such a device embodiment as follows: the DHCP server A 410 comprises a storage module (not shown) and a server address allocation module 411. The storage module may be used for storing the IP address manifest. When the server address allocation module 411 allocates the IP address segment of the server, the address segment in the IP address manifest may be evaded. The server address allocation module 411 may evade the address segment in the IP address manifest in the process of allocation when the DHCP server A is started up; may also evade the address segment in the IP address manifest in the process of reallocation after the IP address conflict message is received; and may also always evade the address segment in the IP address manifest.

A more preferable embodiment based on the above is to combine the random allocation and the IP address manifest with the first and the second device embodiments, which contain various combinations. As an example, in the allocation when the DHCP server A 410 is started up, the server address allocation module 411 may evade the address segment in the IP address manifest, and randomly allocate the IP address segment of the DHCP server A. As another example, when the server address allocation module 411 receives the IP address conflict message, the address segment in the IP address manifest may be evaded, and then the IP address segment of the DHCP server A 410 may be allocated randomly. The DHCP server A 410 may also comprise an IP address segment addition module (not shown). When the server address allocation module 411 receives the monitoring result of the IP address conflict, the current IP address segment of the DHCP server A may be added to the storage module. More preferably, a block of temporary storage space may be set in the storage module, and the current IP address segment of the DHCP server A (or the IP address segment where the DHCP server B is currently located) is added to the temporary storage space. The IP address segment in the temporary storage space will be cleared when the DHCP server A is started up next time.

The present disclosure also provides an embodiment of a network system, comprising the DHCP server A and the client capable of performing the above method embodiment. For example, the client may be a portable computer, the server may be a mobile terminal such as a handset (including a smart phone) or a tablet computer etc. so that one portable computer may be connected to a plurality of handsets or tablet computers. The server may also be a tablet computer including a display unit. The client may be a portable computer not including a display unit. The server and the client may be connected to each other via a wired connection such as a USB interface or interfaces of other types, or a wireless connection such as WiFi or Bluetooth. The display unit of the server may display data of the server and/or the client. Particularly, when the server works separately, the display unit may display data of the server; and when the server and the client are connected physically (wiredly or wirelessly), the display unit may display data of the client separately or display data of the server separately or display data of both the server and the client.

Further, the client includes a first host module and a first interface module. The first host module comprises a first processing unit such as CPU and EC, a first storage unit such as a hard disk and memory, and a first input unit such as a keyboard. The first interface module connects to the first host module via a rotor axis, and the first interface module may rotate around the first host module.

The server comprises a second host module and a second interface module. The second host module comprises a second processing unit such as CPU and MCU, a second storage unit such as a hard disk and a memory, a display unit, a second input unit such as a touch-sensitive unit overlapped with the display unit. The second interface unit is connected to the second host module rigidly.

When the first interface unit and the second interface unit are connected rigidly, the server and the first interface unit may rotate around the first host module together, which may form a system analogous to the conventional notebook computer.

The present disclosure has been described above with reference to the preferred embodiments thereof. It should be understood that various modifications, alternations and additions can be made by those skilled in the art without departing from the spirits and scope of the present disclosure. Therefore, the scope of the present disclosure is not limited to the above particular embodiments but only defined by the claims as attached.

What is claimed is:

1. A method of allocating an Internet Protocol IP address, comprising:
    allocating a first IP address to a first server;
    allocating a second IP address to a client connected to the first server;
    monitoring the client allocated with the second IP address;
    allocating a third IP address to the first server when a monitoring result indicates that an IP address conflict exists between the first IP address and a current IP address of a second server;
    wherein the second server is connected to the client allocated with the second IP address.

2. The method according to claim 1, wherein the IP address conflict existing between the first IP address and the current IP address of the second server comprises: the first IP address and the current IP address of the second server are identical, and a connection message of the client is not received during a preset time period.

3. The method according to claim 1, wherein before allocating the second IP address to the client connected to the first server, the method further comprises: detecting physical access of the client; and
    after allocating the second IP address to the client connected to the first server, the method further comprises: initiating the monitoring of the client.

4. The method according to claim 1, wherein the monitoring result indicating that an IP address conflict exists between the first IP address and the current IP address of the second server comprises: receiving a message from the client as a subnet conflict message, the subnet conflict message indicating that a subnet conflict exists between a subnet in which the first server is located and a subnet in which the second server is located.

5. The method according to claim 1, wherein the IP address conflict existing between the first IP address and the current IP address of the second server further comprises: maintaining the monitoring after a connection message of the client is received during a preset time period;
    receiving a message from the client as a subnet conflict message, the subnet conflict message indicating that a subnet conflict exists between a subnet in which the first server is located and a subnet in which the second server is located.

6. The method according to claim 1, wherein allocating the first IP address to the first server and/or allocating the third IP address to the first server are/is random allocation.

7. The method according to claim 6, wherein the random allocation comprises:
    allocating an IP address segment randomly, and allocating an IP address in the IP address segment to the first server.

8. The method according to claim 1, further comprising: obtaining an IP address segment manifest; and
    avoiding addresses in the IP address segment manifest, when the first IP address and/or the third IP address are/is allocated to the first server.

9. The method according to claim 8, further comprising:
    adding the current IP address and a subnet mask of the second server to the IP address segment manifest, when the monitoring result indicates that the subnet conflict exists between the first IP address and the current IP address of the second server.

10. A server of allocating an Internet Protocol IP address, comprising:
    a sever address allocation module configured to allocate a first IP address to a first server;
    a client address allocation module configured to allocate a second IP address to a client connected to the server;
    a monitoring module configured to monitor the client, and notify the server address allocation module of allocating a third IP address to the server when a monitoring result indicates that a subnet conflict exists between the first IP address of the server and a current IP address of a second server;

wherein the second server is connected to the client and is different from the server.

11. The server according to claim 10, wherein the monitoring module is further configured to deduce the result indicating that the IP address conflict exists between the first IP address and the current IP address of the second server, when the monitoring module does not receive a connection message of the client during a preset time period; and deduce a monitoring result indicating that a subnet conflict exists between the first IP address of the server and the current IP address of the second server, according to the result of IP address conflict.

12. The server according to claim 11, wherein the monitoring module is further configured to maintain the monitoring after the connection message of the client is not received during the preset time period; and deduce the monitoring result indicating that the subnet conflict exists between the first IP address of the server and the current IP address of the second server, when the monitoring module receives a subnet conflict message from the client, the subnet conflict message indicating that the subnet conflict exists between the first IP address of the server and the current IP address of the second server.

13. The server according to claim 10, wherein the monitoring result indicating that the subnet conflict exists between the first IP address of the server and the current IP address of the second server comprises: receiving a message from the client as a subnet conflict message, the subnet conflict message indicating that the subnet conflict exists between a subnet in which the server is located and a subnet in which the second server is located.

14. The server according to claim 10, further comprising: a detection module configured to notify the client address allocation module, after a physical connection is established between the client and the server;
the client address allocation module is further configured to notify the monitoring module of initiating the monitoring of the client, after the second IP address is allocated to the client.

15. The server according to claim 10, wherein the server address allocation module is further configured to allocate the first IP address and/or the third IP address randomly.

16. The server according to claim 10, further comprising a storage module configured to store an IP address segment manifest;
the server address allocation module is further configured to obtain the IP address segment manifest from the storage module, and avoid an IP address range contained in the IP address segment manifest when the first IP address and/or the third IP address are/is allocated.

17. The server according to claim 16, further comprising: an IP address segment addition module configured to save the current IP address and a subnet mask of the second server in the IP address segment manifest, when the monitoring result of the monitoring module is received; wherein the monitoring result is that the subnet conflict exists between the first IP address of the server and the current IP address of the second server.

18. A network system comprising a first server and a client, wherein
the first sever is configured to allocate a first Internet Protocol IP address to itself, and allocate a second IP address to the client, the client being connected to the first server at this point;
the first server is further configured to monitor the client, and allocate a third IP address to itself when a monitoring result indicates that a subnet conflict exists between the first IP address of the server and a current IP address of a second server;
wherein the second server is connected to the client and is different from the first server.

19. The system according to claim 18, wherein the client is configured to calculate on a current IP address and a subnet mask of the server which allocates the IP address to the client, and when the subnet conflict occurs between the first IP address and the current IP address of the second server, the client sends to the first server a subnet conflict message indicating that the subnet conflict occurs between the first IP address and the current IP address of the second server.

20. The system according to claim 18, wherein the client is configured to receive a connection message sent by the server which allocates the IP address to the client; and the first server is further configured to deduce the monitoring result indicating that the subnet conflict exists between the first IP address and the current IP address of the second server.

21. The system according to claim 19, wherein the client does not comprise a display unit, and a display unit in the server is configured to display the client and/or data of the server.

* * * * *